United States Patent [19]

Rybacki

[11] 4,147,647

[45] Apr. 3, 1979

[54] SCALE CONVERTERS

[75] Inventor: Richard L. Rybacki, St. Ann, Mo.

[73] Assignee: Petrolite Corporation, St. Louis, Mo.

[21] Appl. No.: 406,543

[22] Filed: Oct. 15, 1973

[51] Int. Cl.$^2$ ............................ C02B 5/06; C09K 7/02
[52] U.S. Cl. .................................. 252/82; 252/8.55 B; 252/80
[58] Field of Search ...................... 252/80, 82, 8.55 B, 252/180, 181, 175, 56 D, DIG. 11, 89; 210/58

[56] References Cited

U.S. PATENT DOCUMENTS

| | | | |
|---|---|---|---|
| 3,696,040 | 10/1972 | Mayo | 252/8.55 B |
| 3,810,834 | 5/1974 | Jones et al. | 252/180 |

FOREIGN PATENT DOCUMENTS 1233259 3/1971 United Kingdom.

*Primary Examiner*—George F. Lesmes
*Assistant Examiner*—R. Eugene Varndell, Jr.
*Attorney, Agent, or Firm*—Sidney B. Ring; Hyman F. Glass

[57] ABSTRACT

This invention relates to the use of a water soluble maleate salt, preferably disodium maleate, as a scale converter. Such salts convert scale into a water soluble compound which is capable of aqueous removal without the conventional step of employing either (1) an acid wash or (2) a sequestering agent.

10 Claims, No Drawings

SCALE CONVERTERS

The accumulations of scale deposits in producing oil wells, water injection wells, and in industrial equipment, such as, heat exchangers, steam and hot water boilers, condensers, flow lines, treaters, cooling towers, internal combustion engines and other water handling and associated equipment, is a well known problem. For all practical purposes, these deposits are insoluble in water.

In oil and gas well operations, water insoluble scale is formed in tubing, casings, and associated equipment, as well as the well bore and the formation itself, which carry, at least in part, water or brine waters. These waters can contain insoluble calcium, barium, magnesum, and iron salts. Such salts include calcium sulfate (gypsum), barium sulfate, calcium carbonate (limestone), complex calcium phosphate (hydroxyapatite), and magnesium salts.

This scale causes many problems in oil and gas well drilling and treating operations, particularly when it builds up in the piping. Generally, the scale is deposited or formed from a pressure or temperature change in the piping. Such scale deposits inhibit the flow of fluids, such as oil, water and/or other treating fluids through the piping, and if left unchecked will result in a complete blockage of the pipe. In addition, along with the scale, sand silicates, and other inert materials, and in some instances, heavier fractions of crude oil are deposited and entrapped therein.

The removal of such scale is conventionally accomplished by two basic methods. The first method includes treatment of the scale with a scale converter which converts the scale to an acid soluble material followed by treatment with a mineral acid such as HCl. For example, insoluble sulfate scales are generally first reacted with a converter such as a carbonate to yield a water insoluble-acid soluble carbonate scale which is thereafter treated with the mineral acid. A second conventional method includes the use of chelating or sequestering agents, such as ethylenediamine tetraacetic acid or nitrilotriacetic acid.

The first basic method which utilizes a final mineral acid flush has many disadvantages because the mineral acids are corrosive to the piping and tubing, and such methods generally involve two or three step conversion processes which are pressure-sensitive. For example, the removal of a sulfate scale by the conventional converter-acid procedure generally involves a first step of converting the sulfate to a carbonate and a second step of dissolving the carbonate by an acid. Both steps are pressure-sensitive because they involve the release of carbon dioxide. If it is desired to remove a phosphate scale, such as hydroxyapatite, the phosphate scale is initially converted to a sulfate by treatment with sulfuric acid, and the water insoluble sulfate scale is then treated with a carbonate to yield an insoluble scale which in turn is treated with a mineral acid, such as hydrochloric acid, to convert the carbonate scale to soluble chlorides and carbon dioxide. Thus, this method is also pressure-sensitive and is generally ineffective under higher pressure conditions.

The use of a chelating or sequestering agent such as disclosed above, is conventionally a one-step operation. However, the sequestering agent acts very slowly and under critical pH conditions to dissolve the scale and thereby results in relatively long shut-down periods for the well treating operation, for example.

Thus, heretofore scale converters have converted scale to either (1) an acid soluble compound which is removed by an acid wash or (2) a compound which can be removed by a sequestering agent.

I have now discovered scale converters which convert scale directly into a water soluble compound thus obviating the need for either an acid wash or a sequestering agent. These scale converters are water soluble salts and preferably disodium maleate. Scale treated with the converters of this invention is removed by an aqueous wash.

The following examples are presented for purposes of illustration and not of limitation. The compound tested was an aqueous solution of disodium maleate. Tests were carried out as follows. The compound or specified dilution thereof was added to a milk dilution bottle containing 4.0 g of calcium sulfate in the form of small chunks. After the material was allowed to soak for the indicated time period any free liquid was poured off into a weighed filter. The solid remaining was washed with one 100 ml and two 50 ml portions of tap water with any residue being transferred to the filter in the process. The filter was rinsed with about 20 ml of acetone, dried to constant weights and reweighed. The filter and residue was then further treated by addition of two 25 ml portions of 15% hydrochloric acid, rinsed with acetone, and again reweighed. Unless otherwise specified the tests were run at 76° F. The results of this testing are given in Table I.

Table I

| Test | Orig. CaSO$_4$ (g) | 40% DSM Amt. Employed | Further Dilution Media | Final % Dilution | Final Total Vol. | Treatment Duration | % H$_2$O Sol. | Final HCl Total % Conv. | Comments |
|---|---|---|---|---|---|---|---|---|---|
| A | 4.00 | 10 cc | none | — | 10 cc | 24 hrs. | 95% | 97% | |
| B | 4.00 | 25 cc | " | — | 25 cc | 24 hrs. | 99% | 99% | |
| C | 2.00 | 10 cc | " | — | 10 cc | 24 hrs. | 99% | 99% | |
| D | 4.00 | 10 cc | tap H$_2$O | 50% | 20 cc | 24 hrs. | 73% | 75% | |
| E | 4.00 | 10 cc | 5% brine | 50% | 20 cc | 24 hrs. | 79% | 84% | scale was W. Texas CaSO$_4$, Benzine wash included in first wash |
| F | 4.00 | 10 cc | " | 50% | 20 cc | 24 hrs. | 86% | 86% | |
| G | 4.00 | 10 cc | " | 50% | 20 cc | 15 hrs. | 78% | 79% | |
| H | 4.00 | 10 cc | " | 50% | 20 cc | 8 hrs. | 74% | 75% | |
| I | 4.00 | 10 cc | " | 50% | 20 cc | 4 hrs. | 45% | 48% | |
| J | 4.00 | 10 cc | " | 50% | 20 cc | 24 hrs. | 86% | 88% | Gently agitated during test |

Note: Tests A through J employ a 40% solution of disodium maleate (DSM) containing 2% wetting agent.

| X | 4.00 | 10 cc | tap | — | 10 cc | 24 hrs. | 36% | 80% | |
| Y | 4.00 | 10 cc | tap H$_2$O | 50% | 20 cc | 24 hrs. | 42% | 92% | |

Table I-continued

| Test | Orig. CaSO4 (g) | 40% DSM Amt. Employed | Further Dilution Media | Final % Dilution | Final Total Vol. | Treatment Duration | % H2O Sol. | Final HCl Total % Conv. | Comments |
| --- | --- | --- | --- | --- | --- | --- | --- | --- | --- |
| Z | 4.00 | 10 cc | 5% brine | 50% | 20 cc | 24 hrs. | 41% | 91% | |

Tests X, Y and Z employ commercial compounds which are employed to convert CaSO4 to a compound which is then removed by an acid wash.

In order to compare various salts, the above procedure was repeated without the final acid wash. The salts are all fully neutralized salts so that all available acid groups are converted to salts.

The tests for Table II were carried out as follows. 4.0 g CaSO4 in small chunks was treated with 10 cc of a 35-40% solution of the indicated salt and allowed to stand for 24 hours. Excess liquid was poured off and 200 cc of water added and shaken. The solid remaining after filtering was removed, washed with acetone, and dried to constant weight. The percent of CaSO4 dissolved is calculated from this residue.

Table II

| Compound | | |
| --- | --- | --- |
| Salt | Acid | % CaSO4 Dissolved in H2O |
| K | glycolate | 39 |
| NH4 | citrate | 10 |
| Na | citrate | 22 |
| K | citrate | 12 |
| Na | aspartate | 21 |
| NH4 | maleate | 14 |
| Na | acetate | 6 |
| Na | succinate | 8 |
| K | malate | 19 |
| Na | malate | 15 |
| Na | benzoate | 0 |
| K | phthalate | 0 |
| K | fumarate | 21 |
| Na | glycolate | 19 |
| K | maleate | 55 |
| Na | maleate | 99 |

This table clearly indicates the effectiveness of maleates, particularly alkali metal maleates, and most particularly disodium maleate.

Although I do not wish to be bound by theoretical considerations, the following is a possible idealized representation of the stoichiometry of gypsum removal.

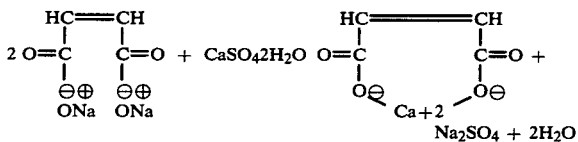

Sufficient converter should be added to dissolve the gypsum present. Theoretically at least a stoichiometric amount of converter is employed. The concentration of the converter employed can vary widely depending on many factors such as the system from which it is to be removed, the agitation of the system, the thickness of the scale deposit, the temperature employed, the pH of the system, etc. Although concentrations of 1 to 90% by weight such as from 25-75% can be employed, I have found that concentrations in excess of 35% are most effective with an optimum of about 45%±5.

Although the solution of the present invention is used as an aqueous solution, it does not preclude the use of dispersions or emulsions with an organic solvent such as an aromatic solvent such as xylene, a straight chain hydrocarbon such as kerosene or diesel to aid in removing paraffins and congealed oil which may be co-deposited with the scale deposit.

Scale is removed by contacting the scale deposits with the solution of this invention for a time sufficient to convert said deposits to a soluble form so as to be removed by an aqueous wash. The details of the process will vary depending on the system from which the scale deposits are to be removed.

The process can be carried out at any operable pH. In general the pH of the salt is generally from about 7.5 to 12.0, but preferably from about 8.5 to 9.5.

Surface active materials chosen for their wetting and penetrating characteristics particularly in wetting scale are helpful when present in the solution, for example, in concentrations ranging from 1 to 10, such as 1-5 or more percent by weight but preferably 1-3%. Any suitable wetting agent can be employed provided it assists in wetting the scale.

When using the composition of the present invention for dissolving calcium sulfate, temperatures substantially above ambient temperature are not required for purposes of efficiency. Temperatures as low as 50° to 60° F. have been found satisfactory. However, an increase in temperature to a range such as normally is found under bottom hole conditions of producing oil wells which may range from about 90° to 160° F. will cause a rapid increase in the reaction and in turn increase the rate of dissolving the calcium sulfate scale.

The composition of the present invention is useful for removing calcium sulfate "gyp" scale or other scale encrustations, such as, sulfates or carbonates of calcium, barium, magnesium, which may be mixed with the "gyp" scale as accumulated deposits on oil, gas, or water well equipment, as well as, industrial equipment. The composition will remove the "gyp" deposits from the rock formation face in "open-hole" type well completions. When pumped into the well, the composition by means of sufficient hydrostatic head pressure, or by applying additional positive pressure to overcome the existing reservoir pressure, will remove the deposited "gyp" scale in the producing channels of the reservoir rock, thus restoring permeability to the flow of oil and/or gas. The composition will also remove or solubilize "gyp" or anhydrite, which may be naturally present as part of the rock matrix, thus establishing new porosity and flow channels for increasing fluid flow into the well.

Field Example

A 40% solution of disodium maleate containing 2% surfactant was employed in treating oil wells having a gypsum problem. The utility and efficiency of the present invention in removing gypsum deposits was shown by these tests which resulted in an improvement in oil or water production in barrels per day as compared to oil or water production prior to treatment.

The above disclosure is illustrative of the invention and variations may be made without departing from the scope of this invention.

I claim:

1. A process for dissolving gypsum containing scale which comprises contacting the scale with a water soluble alkali metal maleate salt as a scale converter in an aqueous system having a pH of 7.5 to 12.0.

2. The process of claim 1 where the maleate salt is a dialkali metal maleate.

3. The process of claim 2 where the maleate salt is disodium maleate.

4. A solution for converting gypsum containing scale to a soluble form comprising an aqueous solution of a water soluble alkali metal maleate salt scale converter and a wetting agent which assists in wetting the scale and having a pH of 7.5 to 12.0.

5. A process of dissolving gypsum containing scale which comprises contacting the scale with the solution of claim 4.

6. The solution of claim 4 where the maleate salt is a dialkali metal maleate.

7. A process of dissolving gypsum containing scale which comprises contacting the scale with the solution of claim 6.

8. The solution of claim 5 where the maleate is disodium maleate.

9. A process of dissolving gypsum containing scale which comprises contacting the scale with the solution of claim 8.

10. A process of dissolving gypsum scale comprising contacting the scale with disodium maleate in an aqueous system having a pH of 7.5 to 12.0.

* * * * *